United States Patent [19]
Duvall

[11] Patent Number: 5,551,470
[45] Date of Patent: * Sep. 3, 1996

[54] THERMALLY RESPONSIVE PRESSURE RELIEF APPARATUS

[76] Inventor: Paul F. Duvall, c/o Brunswick Corporation, 1 N. Field Ct., Lake Forest, Ill. 60045

[*] Notice: The portion of the term of this patent subsequent to Jul. 25, 2012, has been disclaimed.

[21] Appl. No.: 373,073

[22] Filed: Jan. 17, 1995

Related U.S. Application Data

[63] Continuation-in-part of Ser. No. 258,516, Jun. 10, 1994, Pat. No. 5,435,333.

[51] Int. Cl.⁶ ............................. F16K 17/16; F16K 17/40
[52] U.S. Cl. ..................... 137/68.12; 137/68.25; 137/74; 220/89.2; 220/89.4
[58] Field of Search ............... 137/68.12, 68.25, 137/72, 73, 74; 220/89.2, 89.4, 89.1

[56] References Cited

U.S. PATENT DOCUMENTS

| | | | |
|---|---|---|---|
| 1,692,773 | 11/1928 | Friedman | 137/73 X |
| 1,960,272 | 5/1934 | Lovekin | 137/73 |
| 2,166,277 | 7/1939 | Adams | 137/74 X |
| 2,357,620 | 9/1944 | Thomas | 137/73 X |
| 3,911,948 | 10/1975 | Collins, Jr. et al. | 137/73 X |
| 4,046,157 | 9/1977 | Cazalaa et al. | 137/74 |
| 4,064,890 | 12/1977 | Collins et al. | 137/73 |
| 4,352,365 | 10/1982 | Boccardo et al. | 137/73 X |
| 4,750,510 | 6/1988 | Short, III | 137/68.25 X |
| 5,213,128 | 5/1993 | Baird | 137/73 |
| 5,435,333 | 7/1995 | Duvall | 137/73 |

Primary Examiner—John Rivell
Attorney, Agent, or Firm—John R. Hoffman

[57] ABSTRACT

A thermally responsive pressure relief system is provided for a receptacle such a pressure vessel. A passage communicates the interior of the vessel with the exterior thereof. A closure member is positioned in the passage. A fusible bonding material of a selected melting point fixes the closure member in the passage. The closure member includes an integral rupturable section that ruptures at a selected pressure differential between the interior and the exterior of the vessel. The closure member may be mounted in a body member which, in turn, is mounted in an opening in the pressure vessel. The body member may be mounted on a valve which has the passage from the interior of the vessel communicating therethrough.

16 Claims, 5 Drawing Sheets

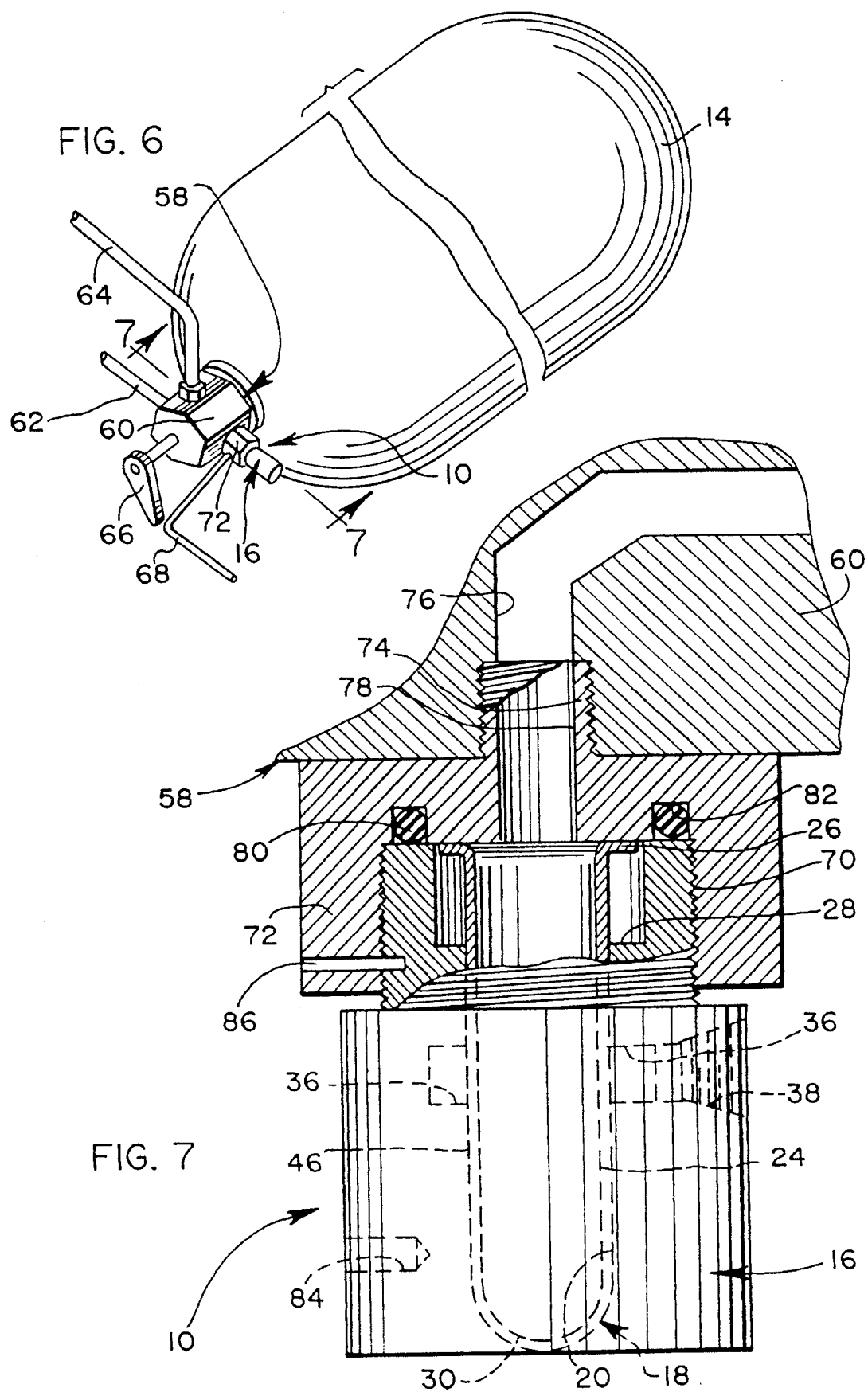

THERMALLY RESPONSIVE PRESSURE RELIEF APPARATUS

RELATED APPLICATION

This is a continuation-in-part of application Ser. No. 08/258,516, filed Jun. 10, 1994, now U.S. Pat. No. 5,435,333.

FIELD OF THE INVENTION

This invention generally relates to the art of safety devices for receptacles such as pressure vessels, and such vessels as those in which compressed gases are stored.

BACKGROUND OF THE INVENTION

A wide variety of fluid pressure relief apparatus have been developed and used heretofore. Such apparatus may include a rupturable member supported so that when the internal pressure of the vessel contents gets too high or exceeds a predetermined level, rupture occurs and fluid pressure is relieved. On the other hand, quite apart from internal pressure, rupture can occur through destruction of the vessel due to increasing temperature of the material of which the vessel is made.

It can be appreciated that a safety valve that opens at a certain pressure value gives some protection against overheating of the vessel itself. However, under certain conditions, such as a partially filled vessel or one made of a material which undergoes a relatively rapid deterioration of its tensile strength or other physical property with increasing temperature, a pressure responsive apparatus may not be sufficient to relieve the pressure before the stresses induced in the vessel exceed the predetermined level. Because of this, it is advantageous to employ a relief apparatus which has both temperature and pressure sensing mechanisms which are independent of each other.

Regarding the material of which the vessel is made, thick walled metal pressure vessels typically have a reasonably long endurance when subjected to high temperatures, such as being engulfed by flames due to a fire, and thus are often protected from catastrophic failure by a pressure type apparatus that ruptures at 25-50% above normal pressure. On the other hand, filament composite pressure vessels typically have much shorter endurance times, and generally the vessel contents do not incur a substantial pressure rise before the structure deteriorates sufficiently to cause a catastrophic failure. Thus filament composite pressure vessels often are protected from catastrophic failure mostly by a thermally activated relief apparatus. Yet, the contents of the vessel still may require a rupturable-type pressure safety mechanism.

Heretofore, combination temperature responsive pressure relief apparatus have been fairly complicated and expensive to manufacture. This is because of the multiple components used in the apparatus. For instance, U.S. Pat. No. 4,352,365 to Boccardo et al, dated Oct. 5, 1982; U.S. Pat. No. 4,744,382 to Visnic et al, dated May 17, 1988; and U.S. Pat. No. 4,750,510 to Short, dated Jun. 14, 1988, are but some examples of combination temperature responsive pressure relief apparatus of the multiple-component type. In other words, each of these patents show one form or another of a lug or other component that is held in place or otherwise operatively associated with a fusible member or material. This provides the temperature responsive means for the apparatus. In addition, a completely separate pressure responsive member, such as a rupturable diaphragm, also is used to provide the pressure responsive portion of the combined apparatus. Sometimes, additional components must be required to hold the rupturable diaphragm in position. In other types of apparatus, separate components must be used to hold a fusible component in position. It readily can be seen how these multi-component apparatus can be relatively expensive.

The present invention is directed to a solution to these problems of complexity and cost by providing a very simple combination temperature responsive and pressure responsive apparatus wherein a single element is held in place within a pressure passage by a fusible bonding material and the element, itself, is designed to be pressure-rupturable.

SUMMARY OF THE INVENTION

An object, therefore, of the invention is to provide a new and improved thermally responsive pressure relief system for a receptacle such as a pressure vessel.

In the exemplary embodiment of the invention, a passage is provided communicating the interior of the vessel with the exterior thereof. A closure member is positioned in the passage. A fusible bonding material of a selected melting point fixes the closure member in the passage. The closure member includes an integral rupturable section that ruptures at a selected pressure differential between the interior and the exterior of the vessel.

As disclosed herein, the closure member has an overall given wall thickness, and the rupturable section comprises a reduced thickness thereof. The closure member includes a dome-shaped portion, and, in one embodiment of the invention, the dome-shaped portion is flattened at a given location in the passage to provide the rupturable section of reduced thickness. The closure member may be of metal material, and the flattened section simply can be ground or machined to provide the reduced thickness.

In another embodiment of the invention, the dome-shaped portion is provided with a groove or slot to provide the rupturable reduced thickness of the closure member.

In a pressure vessel fabricated of filament composite material, a body member may be mounted in an opening in the pressure vessel, with the passage being located in the body member. The closure member is provided as a generally hollow plug member positioned in the passage in the body member for movement between a first position fixed by the fusible bonding material and a second position in response to internal pressure of the vessel when the bonding material melts. Vent passage means are provided through the closure member and in the body member, the vent passage means being closed when the closure member is in its first position and open when the closure member is in its second position.

In a further embodiment of the invention, the body member is mounted in an opening in a fill/shut-off valve which, in turn, is mounted in an opening in the pressure vessel. Otherwise, the novel concepts of the closure member are advantageously applied to applications where such a valve is used, such as at one end of a relatively long pressure tank.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims.

The invention, together with its objects and the advantages thereof, may be best understood by reference to the following description taken in conjunction with the accompanying drawings, in which like reference numerals identify like elements in the figures and in which:

FIG. 6 is a perspective view of an elongated pressure vessel showing an application wherein the thermally responsive pressure relief system or apparatus of the invention is used in conjunction will a fill/shut-off valve;

FIG. 7 is a fragmented section taken generally along line 7—7 of FIG. 6, with the body of the pressure relief apparatus threaded into the valve housing.

DETAILED DESCRIPTION OF THE PREFERRED EMBODIMENTS

Figure 1:
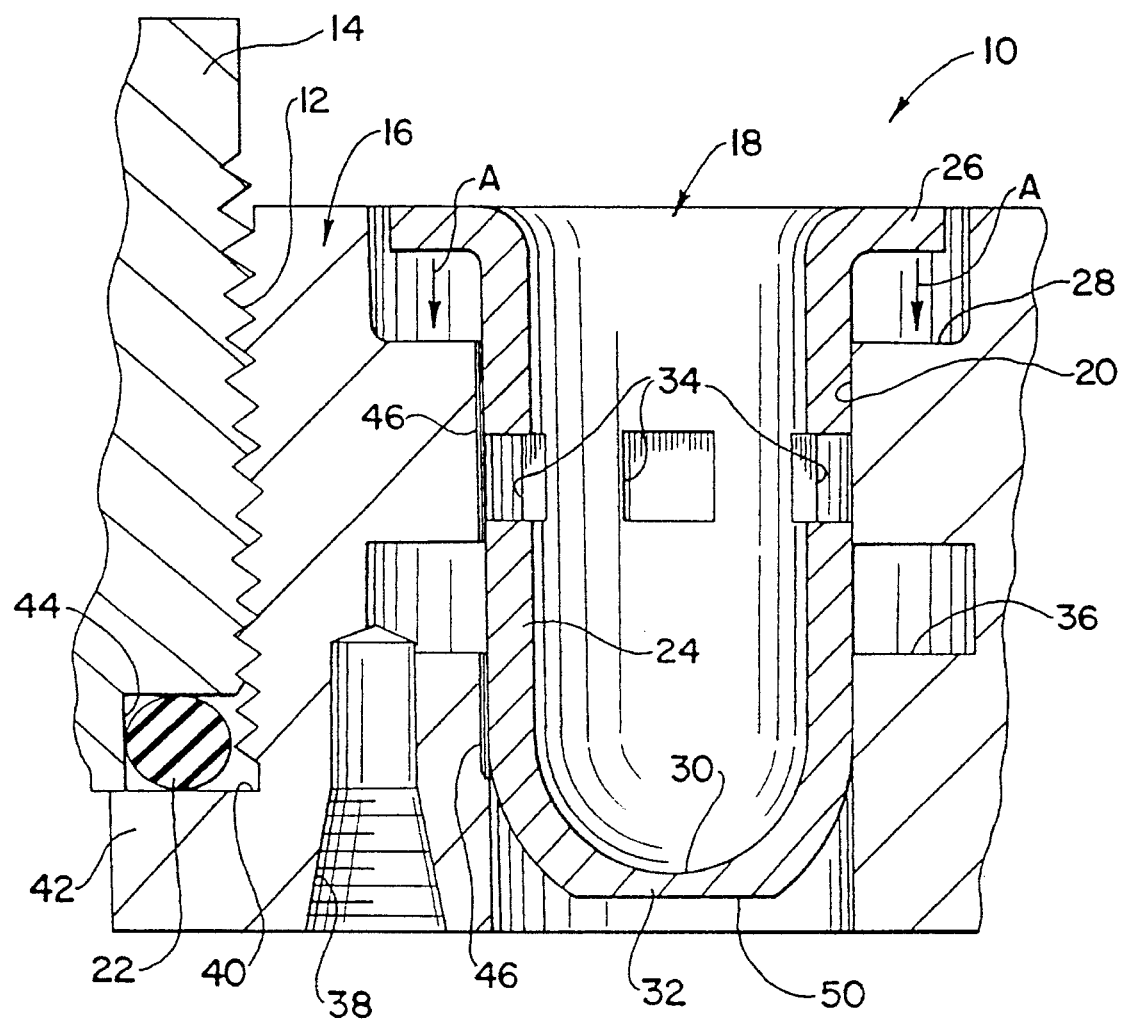
FIG. 1 is a section through one application of the thermally responsive pressure relief system or apparatus of the invention in its normally closed position.
Figure 2:
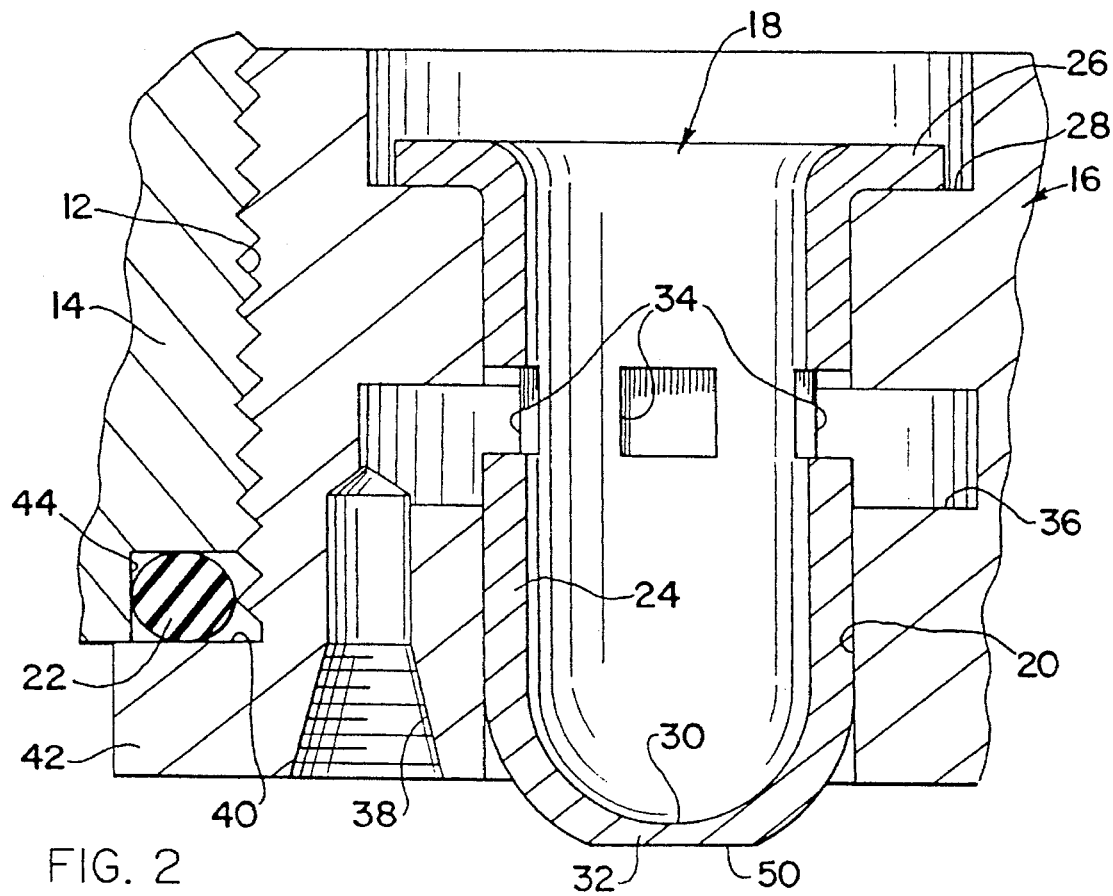
FIG. 2 is a view similar to that of FIG. 1, with the closure member moved to an open position in response to melting of the fusible bonding material.

Referring to the drawings in greater detail, a first embodiment of a thermally responsive pressure relief system or apparatus, generally designated 10, is shown in FIGS. 1 and 2 mounted within an opening 12 in a receptacle such as a pressure vessel 14. Generally, the pressure relief apparatus includes only two components, namely a body member, generally designated 16, mounted within opening 12 of vessel 14, and a closure member or plug, generally designated 18, mounted within a passage 20 within body member 16.

At this point, it should be understood that thermally responsive pressure relief apparatus 10 is shown herein as a two-component system (i.e. body 16 and plug 18), because the invention is quite applicable for use in a pressure vessel 14 fabricated of filament composite material. With such a pressure vessel, it might be advantageous to use body member 16 threaded into opening 12 in the composite wall of the vessel, as shown, and to add a sealing means 22. However, it should be understood that the invention contemplates mounting plug member 18 directly into passage 20 wherein the passage, itself, is the opening in the pressure vessel, thereby obviating the necessity of a separate body member.

With the above understanding, plug member 18 is shown to be generally hollow or cylindrical as defined by outside walls 24 of a given thickness. The upper end (as viewed in the drawings) of plug member 18 includes an outwardly projecting radial flange 26 for abutting against a shoulder 28 of body 16, as described hereinafter. Lastly, the plug includes a plurality of holes 34 through outside walls 24, again for purposes described hereinafter.

As stated above, body 16 is threadably mounted within opening 12 in vessel 14, as shown. Shoulder 28 surrounds passage 20 in the body for abutment by flange 26 of the plug. An annular groove 36 is formed in the body surrounding passage 20 and plug 18. The groove communicates with an outlet 38 to atmosphere. Seal 22 can be a ring seal disposed between a shoulder 40 formed by a flange 42 of the body and an annular recess 44 in vessel 14.

The invention contemplates closure member or plug 18 to be fixed within passage 28 in the position shown in FIG. 1 by a thermally sensitive, fusible bonding material 46 between outside wall 24 of the plug and the inside of passage 20. The fusible bonding material preferably is a low melting point eutectic alloy with sufficient shear strength at 200° F. to withstand a design minimum pressure load (e.g. 7,000–10,000 psig) of pressure vessel 14. The eutectic alloy would be chosen to melt or flow at a temperature in the range of 225°–275° F.

When fusible bonding material 26 melts, the pressure within vessel 14 causes plug 18 to move in the direction of arrows "A" (FIG. 1) to the position shown in FIG. 2. This can be considered the pressure relief position. In this position, flange 26 of plug 18 engages and abuts against shoulder 28 of body 16. In addition, holes 34 in the plug now are aligned with angular groove 36 in the body. Therefore, pressure is relieved from within vessel 14 through holes 34, groove 36 and outlet 38 to atmosphere.

Figure 3:
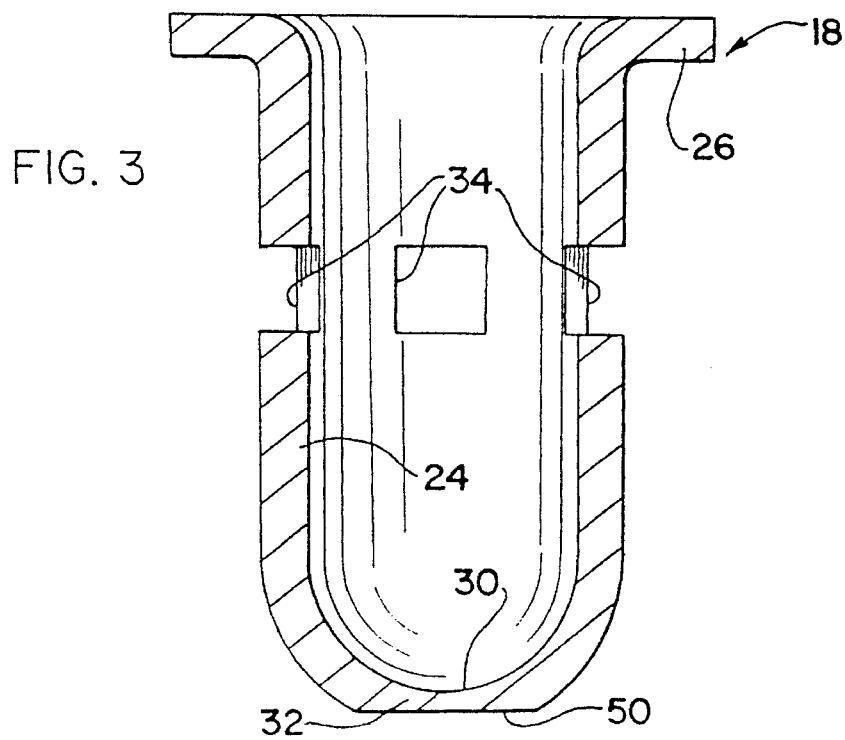
FIG. 3 is an isolated section of the closure member, alone, with one embodiment of an integral rupturable reduced thickness.

Referring to FIG. 3 in conjunction with FIGS. 1 and 2, as stated above, a reduced thickness 32 in the wall means 24 of plug 18 is formed at the bottom dome-shaped portion of the plug. The reduced thickness 32 is clearly seen in FIGS. 1–3. The reduced thickness is provided simply by flattening the outside of dome-shaped portion 30, as at 50. For instance, plug 18 may be readily fabricated of sheet metal material in a drawing process. The outside of the dome-shaped portion of the plug then simply can be flattened at 50 by a grinding or machining process. Holes 34 simply can be punched into the metal material. It can be seen that the fabrication of plug 18 is very simple.

Figure 4:
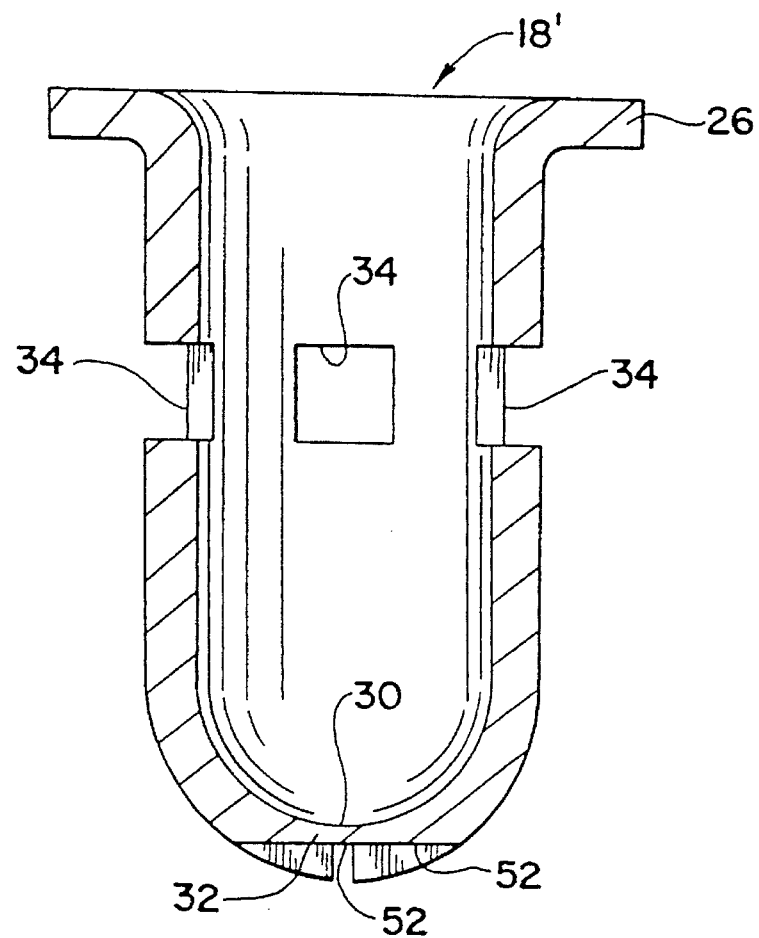
FIG. 4 is a view similar to that of FIG. 3, with the closure member including a second embodiment of an integral rupturable reduced thickness.
Figure 5:
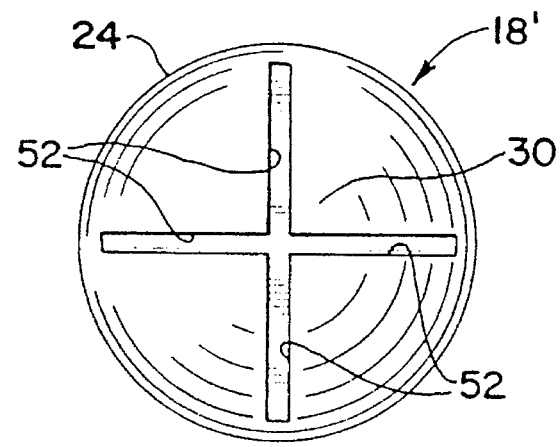
FIG. 5 is a bottom plan view of the closure member in FIG. 4.

FIGS. 4 and 5 show an alternate embodiment of a closure member or plug, generally designated 18', and like numerals are applied in FIGS. 4 and 5 corresponding to like elements described above in relation to FIGS. 1–3. In the embodiment of FIGS. 4 and 5, reduced thickness 32 in wall means 24 of plug 18 is formed inside of grooves 52 formed in the outside of the dome-shaped portion of the plug. FIG. 5 shows that the grooves are in a generally cross-shaped configuration. Again, like the grinding or machining of flattened area 50 in the embodiment of FIGS. 1–3, grooves 52 are very simply formed by a machining operation. On the other hand, if plugs 18 and/or 18' are fabricated of a cast or molded material, flattened area 50 and grooves 52 can be integrally formed in the plug with equal simplicity.

FIG. 6 shows an application of the invention wherein thermally responsive pressure relief system or apparatus 10 is used in conjunction with a fill/shut-off valve means, generally designated 58, which includes a valve housing 60 threaded into an opening in pressure vessel 14 similar to body 16 being threaded into opening 12 as described above in relation to FIGS. 1 and 2.

Figure 8:
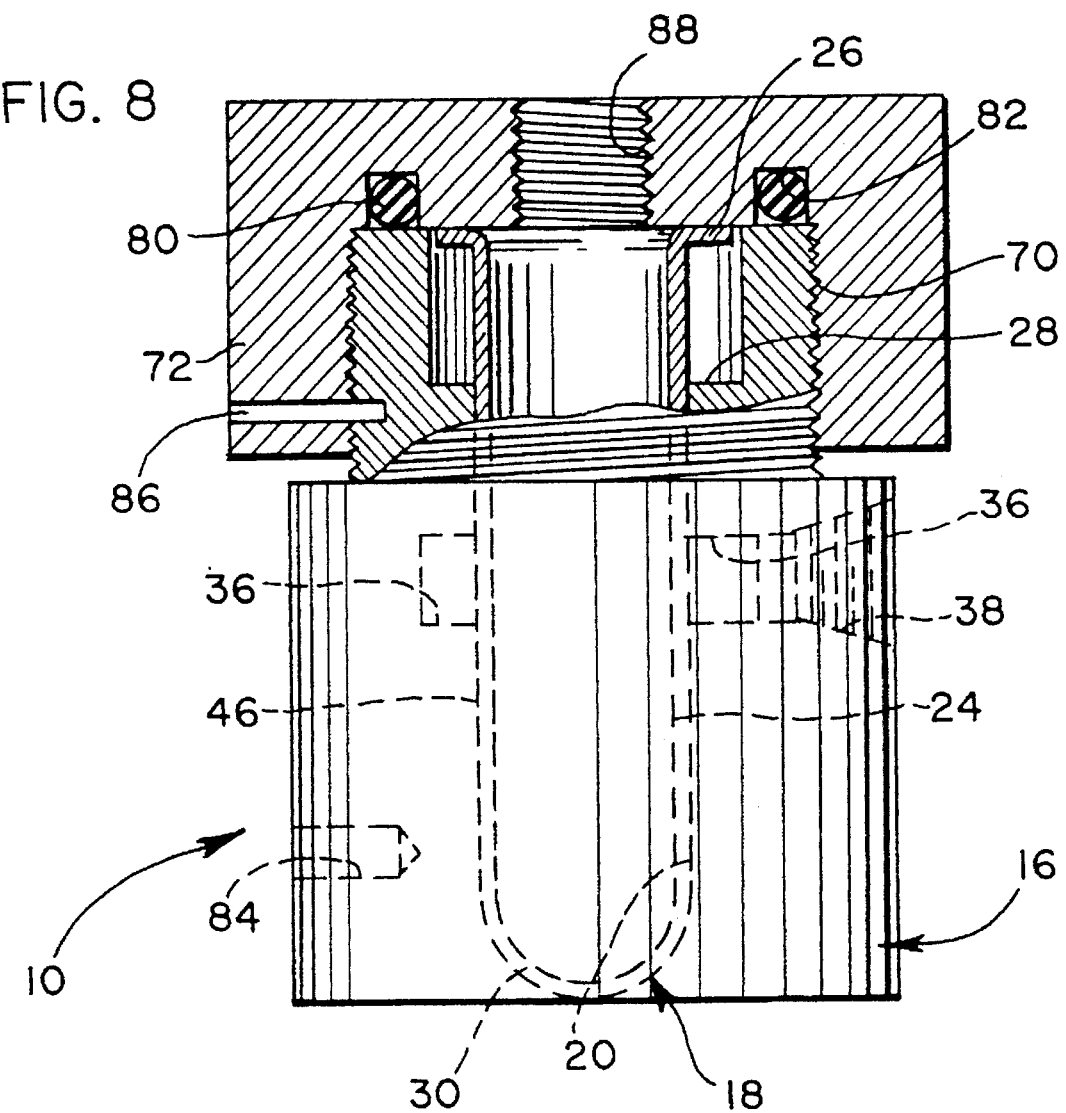
FIG. 8 is a view similar to that of FIG. 7, with the body of the pressure relief apparatus threaded onto a boss of the valve body.

Generally, in elongated pressure vessels as shown in FIG. 6, such as vessels over 65 inches in length, it is desirable to have pressure relief apparatus at both ends of the vessel. However, since one end of an elongated pressure vessel must have some sort of fill and/or shut-off valve means, it heretofore has been difficult to incorporate a pressure relief apparatus at the valve end of the vessel, because prior art pressure relief systems or apparatus have been too complicated. FIGS. 6–8 show how simply the thermally responsive pressure relief apparatus 10 of the invention can be incorporated directly into the valve itself. All that is required is for the pressure relief apparatus to be in a passage that communicates the interior of the vessel with the exterior thereof.

Fill/shut-off valve means 58 can take a variety of configurations and, therefore, will not be described in considerable detail herein. Suffice it to say, conventionally, the valve means includes a fill line 62 and a fuel line 64, the fuel line leading to a vehicle, for instance. A shut-off knob 66 is seen projecting from the end of valve housing 60. The precise arrangement or configuration of the interior valve components are not germane to the invention and are not shown nor described herein. Lastly, a vent line 68 is shown leading from pressure relief apparatus 10.

Referring to FIG. 7 in conjunction with FIG. 6, pressure relief apparatus 10, like the apparatus in FIGS. 1–5, includes a closure member or plug, generally designated 18, mounted within passage 20 in body member 16. The body member similarly has an annular groove 36 communicating with outlet 38 to which vent line 68 (FIG. 6) is coupled. Plug member 18 again is generally hollow or cylindrical as defined by outside walls 24 of a given thickness, with the upper end of the plug member including the radial flange 26 for abutting against shoulder 28 of body 16, as described above. The lower end of the plug is dome-shaped, as at 30, and is flattened to provide the rupturable section of a reduced wall thickness as described in relation to FIGS. 1–3. The plug member may be grooved as shown in FIGS. 4 and 5. The plug member is affixed within passage 20 by the thermally sensitive, fusible bonding material 46 directly between the plug member and the passage.

In the embodiment of FIG. 7, body 16 is threaded, as at 70, into an adapter body which has a small exteriorly threaded boss 74 for threading into a passage 76 in valve housing 60. Adapter body 72 has a passageway 78 communicating with passage 76 in the valve housing. Therefore, rupturable plug member 18 of pressure relief apparatus 10 is mounted in a continuous passage, including passages 76, 78 and 20, communicating the interior of vessel 14 with the exterior thereof.

Lastly, still referring to FIG. 7, an O-ring 80 is sandwiched between the inner end of body 16 and an annular groove 82 in adapter body 72 to create an leak-proof seal between the two bodies. Body 16 has "spanner" holes 84 to facilitate threading the body into adapter body 72, and the adapter body may be of a hexagonal configuration as shown in FIG. 6 for threading the adapter body into valve housing 60. A drive pin 86 may be used to stake adapter body 72 to body 16 to prevent inadvertent disassembly.

FIG. 8 shows a modified version of the system shown in FIG. 7 only to the extent that adapter body 72 is provided with an internally threaded hole 88 rather than the externally threaded boss 74 shown in FIG. 7. Otherwise, like numerals have been applied in FIG. 8 corresponding to like components described above in relation to FIG. 7. In some instances, it may be desirable to thread the pressure relief apparatus onto a male threaded boss of valve housing 60 rather than into the valve housing as shown in FIG. 7.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A thermally responsive pressure relief system for a receptacle such as a pressure vessel which has an opening therein, comprising:

a valve means mounted in said opening;

means defining a passage communicating the interior of the vessel with the exterior thereof through said valve means;

a closure member positioned in said passage;

a fusible bonding material of a selected melting point affixing the closure member in the passage; and the closure member including an integral rupturable section that ruptures at a selected pressure differential between the interior and the exterior of the vessel.

2. The thermally responsive pressure relief system of claim 1 wherein said closure member has an overall given thickness, and said rupturable section of the closure member comprises a reduced thickness thereof.

3. The thermally responsive pressure relief system of claim 2 wherein said closure member includes a dome-shaped portion that is flattened at a given location in the passage to provide said reduced thickness.

4. The thermally responsive pressure relief system of claim 3 wherein said closure member comprises a metal member having the outside of the dome-shaped portion thereof ground away to provide said reduced thickness.

5. The thermally responsive pressure relief system of claim 2 wherein a groove is formed in the closure member to provide said reduced thickness.

6. The thermally responsive pressure relief system of claim 5 wherein said closure member includes a dome-shaped portion in the passage, with said groove being located in the dome-shaped portion.

7. The thermally responsive pressure relief system of claim 1 wherein said closure member is mounted in the passage for movement between a first position fixed by said fusible bonding material and a second position in response to internal pressure of the vessel when the bonding material melts.

8. The thermally responsive pressure relief system of claim 7, including vent passage means through the closure member, the vent passage means being closed when the closure member is in said first position and open when the closure member is in said second position.

9. The thermally responsive pressure relief system of claim 1, including a body member mounted in an opening in said vessel, said passage being located in said body member.

10. A thermally responsive pressure relief system for a receptacle such as a pressure vessel which has an opening therein, comprising:

a valve means mounted in said opening;

means defining a passage communicating the interior of the vessel with the exterior thereof through said valve means;

a body member mounted on said valve means and including a passageway defining a portion of said passage;

a generally hollow plug member positioned in the passageway and including outside wall means of a given thickness about an inside cavity communicating with the vessel;

a fusible bonding material of a selected melting point affixing the plug member to the body member; and the wall means of the plug member including a rupturable section of a reduced thickness that ruptures at a selected pressure differential between the interior and the exterior of the vessel.

11. The thermally responsive pressure relief system of claim 10 wherein said plug member includes a dome-shaped portion that is flattened at a given location in the passageway to provide said reduced thickness.

12. The thermally responsive pressure relief system of claim 11 wherein said plug member comprises a metal member having the outside of the dome-shaped portion thereof ground away to provide said reduced thickness.

13. The thermally responsive pressure relief system of claim 10 wherein a groove is formed in the plug member to provide said reduced thickness.

14. The thermally responsive pressure relief system of claim 13 wherein said plug member includes a dome-shaped portion in the passageway, with said groove being located in the dome-shaped portion.

15. The thermally responsive pressure relief system of claim 10 wherein said plug member is mounted in the passageway for movement between a first position fixed by said fusible bonding material and a second position in response to internal pressure of the vessel when the bonding material melts.

16. The thermally responsive pressure relief system of claim 15, including vent passage means through the plug member, the vent passage means being closed when the plug member is in said first position and open when the plug member is in said second position.

* * * * *